Patented Oct. 19, 1948

2,451,485

UNITED STATES PATENT OFFICE 2,451,485

PRODUCTION OF UNSATURATED CARBONYLIC COMPOUNDS

George W. Hearne, El Cerrito, and Merrill L. Adams, Modesto, Calif., assignors to Shell Development Company, San Francisco, Calif., a corporation of Delaware No Drawing. Application September 27, 1947, Serial No. 776,616

17 Claims. (Cl. 260—604)

This invention relates to the oxidation of olefins containing at least three carbon atoms to vinyl-type carbonyl compounds, that is, to unsaturated aldehydes and ketones containing an olefinic linkage between two carbon atoms of aliphatic character, one of which is directly linked to an aldehyde or ketone group. The invention is of particular value in that it provides a practical and economical method for the production of acrolein from propylene.

The process of the invention is executed by contacting a gaseous mixture comprising an olefin containing at least three carbon atoms and oxygen or an oxygen-containing gas with cuprous oxide or a solid contact mass comprising cuprous oxide, under conditions at which a substantial amount of the olefin is oxidized to a vinyl-type carbonylic compound containing the same number of carbon atoms per molecule.

The invention is generally applicable to the conversion of olefins of three or more carbon atoms to vinyl-type aldehydes or ketones. By the term "olefin" as used herein and in the appended claims is meant the open-chain as well as cyclic olefins. Among the many olefinic compounds which are adapted for use as starting materials, the following may be mentioned: propylene, butene-1, butene-2, isobutylene, pentene-1, pentene-2, 3-methyl-butene-1, 2-methyl-butene-2, hexene-1, hexene-2, 4-methyl-pentene-1, 3,3-dimethyl-butene-1, 4-methyl-pentene-2, octene-1, cyclopentene, cyclohexene, 3-methyl-cyclohexene, etc. These compounds and their various homologues and analogues may be substituted in the nucleus and/or in the substituents in various degrees by straight chain alicyclic and/or heterocyclic radicals. The olefins may be treated individually or as mixtures with each other or with the corresponding or other saturated organic compounds. When treated in mixtures, for example, with the corresponding paraffin, the paraffin may remain substantially, if not wholly, unaffected. In other words, by the present process it is possible to selectively oxidize olefins, saturated compounds if present acting merely as diluents. Conversions effectible by the process of the invention include the conversion of propylene to acrolein, isobutylene to methacrolein, alpha- or beta-butylene to methyl vinyl ketone, pentene-1 or pentene-2 to ethyl vinyl ketone and/or pentene-3-one-2, 2-methyl-butene-2 to methyl isopropenyl ketone, cyclopentene to cyclopentenone-2, and the like.

It is to be noted that the vinyl-type carbonylic products obtained by the process of the invention are not necessarily those which would be expected from the direct substitution of an oxygen atom for two hydrogen atoms in the allyl position, that is, for two hydrogen atoms attached to a carbon atom separated from the double bond by an intervening carbon atom, for in that case beta-butylene, for example, would form crotonaldehyde and not methyl vinyl ketone. Instead, the reaction appears to be initiated at the double bond and proceeds with the elimination of a hydrogen atom from the allyl position and a change in position of the double bond.

Straight chain alpha-olefins of three or more carbon atoms when treated according to the present process tend to yield the same products as the corresponding beta-olefins. Thus, as stated above, alpha-butylene as well as beta-butylene yields methyl vinyl ketone and pentene-1 like pentene-2 yields ethyl vinyl ketone. This is thought to result from isomerization of these alpha-olefins to the beta-olefins under the reaction conditions.

The cuprous oxide catalyst employed in the execution of the process of the invention is preferably supported on or mixed with a suitable carrier material, such as silica gel, alumina, Alundum, diatomaceous earth, silicon carbide porous aggregates, pumice and the like. The carrier material may be in the form of granules, lumps, particles, powder, fragments, pellets, rings or other formed pieces, or in other forms of regular or irregular contour. The amount of cuprous oxide on the carrier material may vary from a fraction of a per cent to 20 per cent or more of the total weight of the contact mass. Impregnation of the oxide on the carrier may be carried out, for example, by treating the degassed carrier with a concentrated solution of cupric nitrate or chloride or with an ammonium compound comprising copper, as copper ammonium nitrate. The nitrate and ammonium compounds may be decomposed to cuprous oxide by first heating the dried carrier between about 250° C. and 400° C. in a slow stream of air and then reducing the cupric oxide thus formed to cuprous oxide with hydrogen or other suitable reducing agent. Substantially the same procedure is followed in the preparation of the catalyst from the chloride except that repeated oxidation and reduction may be necessary. Cupric oxide is completely ineffective when applied in lieu of cuprous oxide in the execution of the process, the desired unsaturated aldehydes and ketones being producible only after it has been reduced to the cuprous form.

According to a preferred mode of executing the process, the vapors of the olefin to be oxidized are contacted with the cuprous oxide supported on a carrier in the presence of oxygen or an oxygen-containing gas, such as air. Although considerable latitude is permissible the reaction temperature desirably is maintained in the range of from about 150° C. to about 600° C., and preferably from about 200° C. to about 450° C., the temperature used depending upon the catalyst, the particular olefin being treated, the rate of throughput or contact time, and the ratio of the olefin to oxygen. It has been determined that unless the temperature is kept under reasonable control, the oxidation may proceed to the formation of carbon dioxide and water at the expense of the desired product. The temperature may be controlled, for example, by diluting the reaction mixture with steam, by operating with an excess of olefin and/or by using a carrier or supporting material which is a good heat conductor. Also, the cuprous oxide, alone or supported on a suitable carrier material, may be used in a dust or "fluidized" form and agitated to dissipate the heat of reaction. The reaction may be conducted at any pressure commensurate with the temperature at which it is desired to operate but usually the reaction is carried out at pressures near atmospheric pressure or moderately above.

The process of the invention may be executed at conditions which lead to complete consumption of the olefin or the oxygen, whichever is present in the lesser amount, or it more desirably may be executed at conditions which lead to only partial consumption of the reactants in a pass of the reaction mixture over the catalyst. When it is desired to produce acrolein by the oxidation of propylene according to the invention conditions within the following non-limiting ranges may be employed advantageously:

| | |
|---|---|
| Oxygen concentration in reaction mixture prior to contact with the catalyst, volume per cent | 1 to 12 |
| Mole ratio, propylene to oxygen | 2:1 to 30:1 |
| Balance of feed | Steam and/or inert gases, such as $N_2$, $CO_2$, propane, etc. |
| Apparent contact time, seconds | 0.001 to 15 |
| Temperature, C. | 250 to 600 |
| Pressure, atmospheres | 1 to 15 |

The following non-limiting ranges of conditions are preferred for the oxidation of propylene to acrolein according to the invention:

| | |
|---|---|
| Oxygen concentration in reaction mixture prior to contact with the catalyst, volume per cent | 4 to 8 |
| Mole ratio, propylene to oxygen | 4:1 to 10:1 |
| Balance of reaction mixture | Steam, or steam and inert gases, such as $N_2$, $CO_2$, propane, etc. |
| Apparent contact time, seconds | 0.1 to 2 |
| Temperature, °C. | 250 to 450 |
| Pressure, atmospheres | 1 to 10 |

In the foregoing, the "apparent contact time" may be defined as the time in seconds which one volume of the reaction mixture under the conditions of temperature and pressure existing in the reaction zone is in contact with one volume of the catalyst measured in bulk, and may be calculated, in a continuous-flow process, from the flow rate of the reaction mixture and the amount (volume) of the catalyst, measured in bulk. The oxidation of propylene according to the invention may be effected advantageously under conditions at which from about 20 to about 80 per cent of the oxygen present in the initial reaction mixture is consumed. The oxygen consumption may be controlled conveniently under the otherwise existing conditions by adjustment of the apparent contact time and the reaction temperature, higher temperatures and longer contact times favoring increased consumption of oxygen, and vice versa. Conditions generally similar to the foregoing may be employed advantageously for the catalytic oxidation of isobutylene to methacrolein, the straight-chain butylenes to methyl vinyl ketone, etc.

In general, any apparatus of the type suitable for carrying out oxidation reactions in vapor phase may be employed in the execution of the process. When operating with a fixed bed catalyst as is preferred, the apparatus may comprise a catalyst packed reaction tube or chamber positioned within a metal block, as an aluminum block or other temperature-regulating means, as a fluid temperature-regulating bath, which is provided with appropriate heating and/or cooling elements. The reactor may be brought to the reaction temperature before or after the vapors to be reacted are introduced thereinto. If before, the olefin may be vaporized in the forepart of the tube rather than in a separate vaporizer. In large scale operation, it is preferred to carry out the process in a continuous manner, any unreacted olefin and/or oxygen being recirculated with fresh feed. The reaction may be conducted in one or a plurality of reaction zones. In a multiple bed reactor, all or only a part of the olefin and/or the oxygen may be introduced into the initial reaction mixture; for example, when a plurality of catalyst beds connected in series is employed, part of the oxygen may be withheld from the initial reaction mixture and introduced at one or more stages intermediate to two beds of the catalyst. Coolants, e. g., liquid water, may be added to the reaction mixture during the reaction or between the catalyst beds in a system comprising a plurality in order to assist in the disposal of the heat liberated by the reaction.

The unsaturated carbonyl product or products are isolated from the exit gases from the reaction zone by any appropriate means, the exact procedure in any given case being naturally determined by the nature and relative amounts of the other reaction products. Usually the exit gases are scrubbed with cold water or other appropriate solvent to remove the carbonyl product which is subsequently recovered from the solvent by any suitable means, as by distillation. The efficiency of the scrubbing operation may be improved when water is employed as the scrubbing agent by adding a suitable wetting agent, e. g. any soap or soap-like substance to the water. If desired, scrubbing of the reaction gases may be preceded by an initial cold water quenching thereof, which of itself may serve to separate a large portion of the carbonyl product.

Where molecular oxygen is being employed as the oxidizing agent the residual mixture subsequent to the separation of the carbonyl product may be treated as with a potassium hydroxide solution of suitable strength to effect the removal of carbon dioxide. The remainder of the mixture which comprises any unreacted olefin and oxygen may then be recycled through the reactor. In the event that air is being used as the oxidizing agent in lieu of molecular oxygen, the residual mixture after separation of the carbonyl product may be scrubbed with a non-polar solvent, e. g. a hydrocarbon fraction as kerosene, in order to recover unreacted olefin and the remaining gas discarded.

Various phases of the invention are illustrated by the following examples:

Example I

The catalyst was prepared by impregnating 8 to 20 mesh silicon carbide porous aggregates with a 40% by weight aqueous solution of copper nitrate, drying, decomposing the nitrate to the oxide by heating at 300° C. to 400° C. in a slow stream of air, and reducing the cupric oxide to cuprous oxide. The catalyst contained about .4% by weight of cuprous oxide.

A mixture consisting by weight of about 4.4 parts propylene, 1 part oxygen, and 4.7 parts water (steam) was passed over 775 grams of the catalyst in a Pyrex glass tube 4.4 cm. in diameter and 51 cm. long enclosed in an aluminum block heated at 368° C. The rate of throughput was such that approximately 86% of the propylene went through the reactor unchanged. The yield of acrolein based upon the propylene consumed, assuming that aldehydes and $CO_2$ were the only products, was about 65%.

In a second experiment conducted at a temperature of 355° C., wherein the weight ratio of the reactants was the same as above except that only 2 parts steam was used, the yield of acrolein based on the propylene consumed was about 63%. A similar yield was obtained with 3.2 parts steam at a reaction temperature of 342° C.

Example II

In another experiment, a mixture consisting by volume of about 7.8% oxygen, about 27.6% propylene, about 35.3% steam and about 29.3% nitrogen was passed at an average pressure of about 37 pounds per square inch (absolute) over one liter of a catalyst prepared as in Example I containing 1.43% by weight of copper in the form of cuprous oxide supported on 6 to 8 mesh silicon carbide porous aggregates. The catalyst was in a reaction tube 1 inch in diameter and 10 feet 8 inches long surrounded by a liquid heat-regulating bath maintained at 348° C. Under the apparent contact time that was employed (approximately 0.8 second), about 24% of the oxygen reacted. The yield of crude acrolein was about 86% based upon the amount of the propylene consumed. The crude acrolein was recovered by separating from the mixture leaving the reactor and fractionally-distilling the condensible and the water-soluble products of the reaction.

Example III

A mixture of 2½ parts propylene, 1 part oxygen and 7 parts steam was passed through a catalyst of cupric oxide on powdered pumice in a two-liter Pyrex glass flask which was agitated by a mechanical stirrer. The mixture entered at the bottom of the flask and was withdrawn at the top through a glass cloth filter. At a temperature of 325° C. no carbonyl compounds were formed. At 375° C., the cupric oxide was reduced by the olefin changing from black to brick red in color and the reaction products had a strong odor of acrolein. The temperature was lowered to 325° C. and the products were collected for a four-hour period during which the catalyst was maintained in the reduced state. About 27% of the consumed olefin was converted to acrolein.

Example IV

A mixture consisting by weight of about 3½ parts beta-butylene 1 part oxygen and 5 parts water (steam) was passed over the catalyst of Example I at a block temperature of 310° C. The maximum temperature in the catalyst bed was 380° C. to 400° C. Under the contact time allowed 87.2% of the butylene was unchanged. Approximately 19% of the consumed butylene was converted to methyl vinyl ketone.

Example V

About 5 parts alpha-butylene, 1 part oxygen, and 9 parts steam were passed over the catalyst employed in Example I at a reaction temperature which varied between about 300° C. and 330° C. Approximately 35% of the butylene was converted to oxidation products. On the butylene consumed the yield of methyl vinyl ketone (loss-free basis) was 32.3%.

Example VI

A catalyst containing 1.4% by weight of cuprous oxide deposited on 8 to 10 mesh silicon carbide porous aggregates was prepared by the method described in Example I. A mixture consisting of about 3.3 parts by weight of isobutylene, 1 part by weight of oxygen, and 6.8 parts by weight of steam was passed through a tube ⅝" in diameter and 160 inches long filled with the catalyst and surrounded by a liquid temperature-regulating bath heated at 430° C. At the rate of throughput that was employed (about 12 grams of the mixture per minute) approximately 76% of the isobutylene was unchanged. Approximately 55% of the isobutylene that was consumed was converted to methacrolein.

This application is a continuation-in-part of the copending application Serial No. 476,786, filed February 22, 1943, now abandoned.

We claim as our invention:

1. A process for the production of an unsaturated carbonylic compound of the group consisting of the unsaturated aldehydes and the unsaturated ketones, which comprises passing a gaseous mixture comprising an olefin containing at least three carbon atoms and oxygen into contact with a solid catalyst essentially comprising cuprous oxide.

2. A process for the production of an unsaturated carbonylic compound of the group consisting of the unsaturated aldehydes and the unsaturated ketones, which comprises passing a gaseous mixture comprising an olefin containing at least three carbon atoms and air into contact with a solid catalyst essentially comprising cuprous oxide.

3. A process for the production of an unsaturated carbonylic compound of the group consisting of the unsaturated aldehydes and the unsaturated ketones, which comprises passing a gaseous mixture comprising an olefin containing at least three carbon atoms and oxygen into contact with a solid catalyst essentially comprising cuprous oxide maintained at a temperature in the range of from about 150° C. to about 600° C.

4. A process for the production of acrolein by the direct oxidation of propylene which comprises passing a gaseous mixture comprising propylene and oxygen into contact with a solid catalyst essentially comprising cuprous oxide.

5. A process for the production of acrolein by the direct oxidation of propylene which comprises passing a gaseous mixture of propylene, oxygen, and water into contact with a solid catalyst essentially comprising cuprous oxide.

6. A process for the production of acrolein by the direct oxidation of propylene which comprises passing a gaseous mixture comprising propylene and oxygen into contact with a solid catalyst consisting of cuprous oxide supported on silicon carbide porous aggregates maintained at a temperature in the range of from about 150° C. to about 600° C.

7. A process for the production of methacrolein by the direct oxidation of isobutylene which comprises passing a gaseous mixture comprising isobutylene and oxygen into contact with a solid catalyst essentially comprising cuprous oxide.

8. A process for the production of methacrolein by the direct oxidation of isobutylene which comprises passing a gaseous mixture comprising isobutylene and oxygen into contact with a solid catalyst essentially comprising cuprous oxide maintained at a temperature in the range of from about 150° C. to about 600° C.

9. A process for the production of acrolein by the direct oxidation of propylene which comprises passing a gaseous mixture comprising propylene and oxygen, the propylene being present in a greater molar amount than the oxygen, into contact with a solid catalyst essentially comprising cuprous oxide at a temperature in the range of from about 250° C. to about 450° C. and adjusting the temperature and the time of contact of the mixture with the catalyst to conditions at which from about 20% to about 80% of the oxygen initially present is consumed.

10. A process for the production of acrolein by the direct oxidation of propylene which comprises passing a gaseous mixture comprising propylene and oxygen and steam, the propylene being present in a greater molar amount than the oxygen, into contact with a solid catalyst essentially comprising cuprous oxide supported on a carrier material at a temperature in the range of from about 250° C. to about 450° C., and adjusting the temperature and the time of contact of the mixture with the catalyst to conditions at which from about 20% to about 80% of the oxygen initially present is consumed.

11. A process for the production of an unsaturated carbonylic compound of the group consisting of the unsaturated aldehydes and the unsaturated ketones, which comprises passing a gaseous mixture comprising an olefin containing at least three carbon atoms and oxygen, the olefin being present in a greater molar amount than the oxygen, into contact with a solid catalyst essentially comprising cuprous oxide at a temperature in the range of from about 150° C. to about 600° C., and adjusting the temperature and the time of contact of the mixture with the catalyst to conditions at which from about 20% to about 80% of the oxygen initially present is consumed.

12. A process for the production of an unsaturated carbonylic compound of the group consisting of the unsaturated aldehydes and the unsaturated ketones, which comprises passing a gaseous mixture comprising an olefin containing at least three carbon atoms and oxygen and water, the olefin being present in a greater molar amount than the oxygen, into contact with a solid catalyst essentially comprising cuprous oxide supported on a carrier material at a temperature in the range of from about 150° C. to about 600° C., and adjusting the temperature and the time of contact of the mixture with the catalyst to conditions at which from about 20% to about 80% of the oxygen initially present is consumed.

13. A process for the production of acrolein by the direct oxidation of propylene which comprises passing a gaseous mixture comprising propylene and oxygen, the propylene and the oxygen being present in a molar ratio of propylene to oxygen from about 4:1 to about 10:1, into contact with a solid catalyst essentially comprising cuprous oxide supported on a carrier material at a temperature in the range of from about 250° C. to about 450° C. at a rate corresponding to an apparent contact time of the mixture with the catalyst in the range of from about 0.1 second to about 2 seconds.

14. A process for the production of methacrolein by the direct oxidation of isobutylene which comprises passing a gaseous mixture comprising isobutylene and oxygen and steam, the isobutylene being present in a greater molar amount than the oxygen, into contact with a solid catalyst essentially comprising cuprous oxide supported on a carrier material at a temperature in the range of from about 150° C. to about 600° C., and adjusting the temperature and the time of contact of the mixture with the catalyst to conditions at which from about 20% to about 80% of the oxygen initially present is consumed.

15. A process for the production of methyl vinyl ketone by the direct oxidation of a straight chain butylene which comprises passing a gaseous mixture comprising a straight chain butylene and oxygen into contact with a solid catalyst essentially comprising cuprous oxide.

16. A process for the production of methyl vinyl ketone by the direct oxidation of a straight chain butylene which comprises passing a gaseous mixture comprising a straight chain butylene, oxygen, and water into contact with a solid catalyst essentially comprising cuprous oxide at a temperature in the range of from about 150° C. to about 600° C.

17. A process for the production of methyl vinyl ketone by the direct oxidation of a straight chain butylene which comprises passing a gaseous mixture comprising a straight chain butylene and oxygen, the butylene being present in a greater molar amount than the oxygen, into contact with a solid catalyst essentially comprising cuprous oxide supported on a carrier material at a temperature in the range of from about 150° C. to about 600° C., and adjusting the temperature and the time of contact of the mixture with the catalyst to conditions at which from about 20% to about 80% of the oxygen initially present is consumed.

GEORGE W. HEARNE.
MERRILL L. ADAMS.

REFERENCES CITED

The following references are of record in the file of this patent:

UNITED STATES PATENTS

| Number | Name | Date |
| --- | --- | --- |
| 2,066,622 | Hasche | Jan. 5, 1937 |
| 2,186,688 | Walker | Jan. 9, 1940 |
| 2,273,573 | Hasche | Feb. 17, 1942 |
| 2,283,711 | Clark et al. | Aug. 28, 1945 |
| 2,400,959 | Stewart | May 28, 1946 |

FOREIGN PATENTS

| Number | Country | Date |
| --- | --- | --- |
| 350,922 | Germany | Mar. 31, 1922 |
| 744,401 | France | Apr. 20, 1933 |

OTHER REFERENCES

Willstatter: "Annalen der Chem.," vol. 422 (1920), pages 36 to 41.

Meyer: "Jour. F. Prak. Chem.," (2), 10, 113 (1874).